US010833875B2

(12) United States Patent
Cheng et al.

(10) Patent No.: US 10,833,875 B2
(45) Date of Patent: *Nov. 10, 2020

(54) METHODS AND DEVICES FOR PROCESSING CERTIFICATES IN BLOCKCHAIN SYSTEM

(71) Applicant: Advanced New Technologies Co., Ltd., Grand Cayman (KY)

(72) Inventors: Long Cheng, Zhejiang (CN); Yanpeng Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,205

(22) Filed: May 18, 2020

(65) Prior Publication Data

US 2020/0287727 A1  Sep. 10, 2020

Related U.S. Application Data

(63) Continuation of application No. 16/719,548, filed on Dec. 18, 2019, now Pat. No. 10,700,876, which is a
(Continued)

(51) Int. Cl.
*H04L 29/06* (2006.01)
*H04L 9/32* (2006.01)

(52) U.S. Cl.
CPC .......... *H04L 9/3268* (2013.01); *H04L 9/3239* (2013.01); *H04L 9/3297* (2013.01); *H04L 2209/38* (2013.01)

(58) Field of Classification Search
CPC ... H04L 9/3239; H04L 9/3263; H04L 9/3297; H04L 2209/38
See application file for complete search history.

(56) References Cited

U.S. PATENT DOCUMENTS 10,102,265 B1 * 10/2018 Madisetti ........... G06Q 20/0658
10,204,339 B2 * 2/2019 Madisetti .............. H04L 9/3239
(Continued)

FOREIGN PATENT DOCUMENTS

CN     107819749 A     3/2018
CN     108876382 A     11/2018
(Continued)

OTHER PUBLICATIONS

Extended European Search Report for Application No. 19725914.6, dated Apr. 22, 2020.
(Continued)

*Primary Examiner* — Sher A Khan
(74) *Attorney, Agent, or Firm* — Finnegan, Henderson, Farabow, Garrett & Dunner, L.L.P.

(57) ABSTRACT

Disclosed herein are methods, devices, and apparatuses, including computer programs stored on computer-readable media, for processing certificates in a blockchain system. One of the methods includes: causing a smart contract to be generated in the blockchain system, wherein the smart contract includes computer-readable instructions for processing certificates; after the smart contract is generated, sending a first request for a first transaction to the blockchain system, the first transaction causing the blockchain system to execute the smart contract to generate a certificate specification based on the first request; receiving, from the blockchain system, the certificate specification; and sending, to the blockchain system, a second request for a plurality of second transactions, the plurality of second transactions causing the blockchain system to execute the smart contract to generate a plurality of certificates.

19 Claims, 7 Drawing Sheets

Related U.S. Application Data continuation of application No. PCT/CN2019/076866, filed on Mar. 4, 2019.

(56) References Cited

U.S. PATENT DOCUMENTS

| | | | |
|---|---|---|---|
| 10,243,748 B1 * | 3/2019 | Callan | H04L 9/0643 |
| 2017/0155515 A1 * | 6/2017 | Androulaki | G06F 21/64 |
| 2018/0227293 A1 * | 8/2018 | Uhr | G06Q 20/3821 |
| 2019/0012695 A1 | 1/2019 | Bishnoi et al. | |
| 2019/0180371 A1 * | 6/2019 | Benkert | G06Q 40/04 |
| 2019/0347653 A1 * | 11/2019 | Lu | H04L 9/3239 |
| 2019/0363896 A1 * | 11/2019 | Finlow-Bates | H04L 9/3265 |
| 2020/0004846 A1 * | 1/2020 | Camenisch | H04L 9/3263 |

FOREIGN PATENT DOCUMENTS

| | | | | |
|---|---|---|---|---|
| CN | 108960825 A | 12/2018 | | |
| CN | 109360054 A | 2/2019 | | |
| WO | WO-2019080235 A1 * | 5/2019 | | H04L 41/0663 |
| WO | WO 2019080235 A1 | 5/2019 | | |

OTHER PUBLICATIONS

International Search Report of PCT Application No. PCT/CN2019/076866, dated Nov. 25, 2019, issued by the ISA/CN—National Intellectual Property Administration, PRC, China.

Written Opinion of the International Searching Authority of PCT Application No. PCT/CN2019/076866, dated Nov. 25, 2019, issued by the ISA/CN—National Intellectual Property Administration, PRC, China.

* cited by examiner

METHODS AND DEVICES FOR PROCESSING CERTIFICATES IN BLOCKCHAIN SYSTEM

CROSS REFERENCE TO RELATED APPLICATIONS

This application is a continuation of U.S. application Ser. No. 16/719,548, filed on Dec. 18, 2019, which is a continuation of International Application No. PCT/CN2019/076866, filed Mar. 4, 2019, the entire contents of all of which are incorporated herein by reference.

TECHNICAL FIELD

The specification relates generally to computer technologies, and more particularly, to methods and devices for processing certificates in a blockchain system.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

Due to the requirement of transparency, processing of certificates (e.g., coupons, tickets, and the like) may be implemented in a blockchain system. Conventionally, a certificate is created based on a contract account of a smart contract running in the blockchain system. For example, when a certificate is created, distributed, or written off, the account of the smart contract needs to be updated accordingly, to maintain the accuracy and balance of the account. However, updating the account for one certificate may take a few seconds to a few minutes. Therefore, during a system-busy time period, processing a large number of certificates in a conventional manner may impact performance of the blockchain system.

SUMMARY

In one aspect, a computer-implemented method for processing certificates in a blockchain system includes: causing a smart contract to be generated in the blockchain system, wherein the smart contract includes computer-readable instructions for processing certificates; after the smart contract is generated, sending a first request for a first transaction to the blockchain system, the first transaction causing the blockchain system to execute the smart contract to generate a certificate specification based on the first request; receiving, from the blockchain system, the certificate specification; and sending, to the blockchain system, a second request for a plurality of second transactions, the plurality of second transactions causing the blockchain system to execute the smart contract to generate a plurality of certificates.

In another aspect, a device for processing certificates in a blockchain system includes: one or more processors; and one or more computer-readable memories coupled to the one or more processors and having instructions stored thereon that are executable by the one or more processors to: cause a smart contract to be generated in the blockchain system, wherein the smart contract includes computer-readable instructions for processing certificates; after the smart contract is generated, send a first request for a first transaction to the blockchain system, the first transaction causing the blockchain system to execute the smart contract to generate a certificate specification based on the first request; receive, from the blockchain system, the certificate specification; and send, to the blockchain system, a second request for a plurality of second transactions, the plurality of second transactions causing the blockchain system to execute the smart contract to generate a plurality of certificates.

In yet another aspect, a non-transitory computer-readable medium has stored therein instructions that, when executed by a processor of a device, cause the device to perform a method for processing certificates in a blockchain system. The method includes: causing a smart contract to be generated in the blockchain system, wherein the smart contract includes computer-readable instructions for processing certificates; after the smart contract is generated, sending a first request for a first transaction to the blockchain system, the first transaction causing the blockchain system to execute the smart contract to generate a certificate specification based on the first request; receiving, from the blockchain system, the certificate specification; and sending, to the blockchain system, a second request for a plurality of second transactions, the plurality of second transactions causing the blockchain system to execute the smart contract to generate a plurality of certificates.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
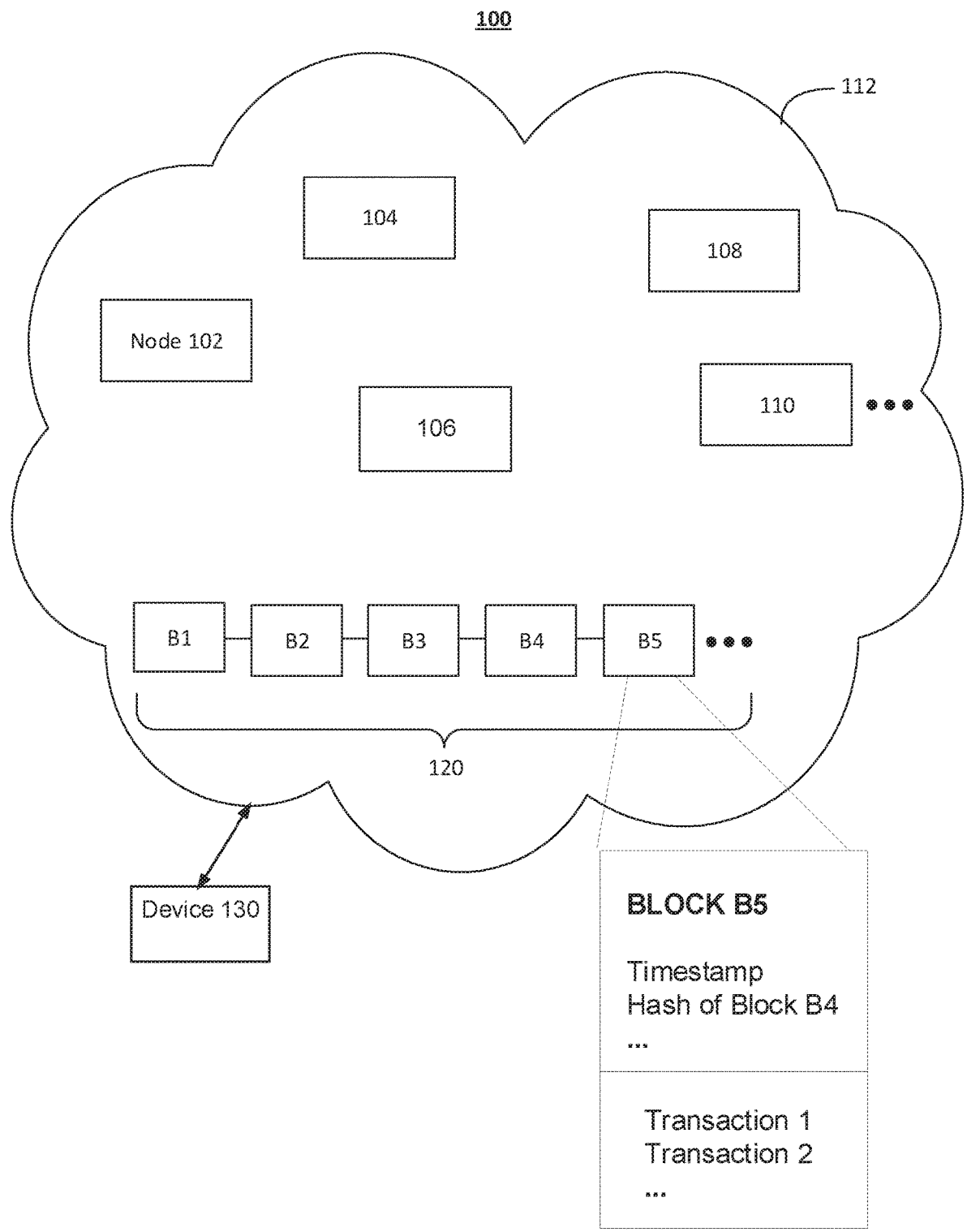
FIG. 1 is a schematic diagram of a blockchain system, according to an embodiment.

Embodiments of the specification provide methods and devices for processing certificates in a blockchain system.

The methods and devices may cause a smart contract to be generated in the blockchain system. The smart contract includes computer-readable instructions for processing certificates. After the smart contract is generated, the methods and devices may send a first request for a first transaction to the blockchain system, the first transaction causing the blockchain system to execute the smart contract to generate a certificate specification based on the first request. The methods and devices may receive the certificate specification from the blockchain system. The methods and devices may further send a second request for a plurality of second transactions to the blockchain system. The plurality of second transactions cause the blockchain system to execute the smart contract to generate a plurality of certificates.

Embodiments disclosed in the specification have one or more technical effects. In some embodiments, the methods and devices cause the blockchain system to execute a smart contract to generate the certificate specification. This allows the certificate specification to be publicly accessible on the blockchain system, ensuring transparency of the transaction activity. In some embodiments, the methods and devices further cause the blockchain system to execute the smart contract to generate certificates based on the certificate specification. This allows the generation of accurate certificates with information specified in the certificate specification, thereby improving system performance and saving the computing cost of running a contract account in the blockchain system. In other embodiments, the methods and devices cause the blockchain system to execute a plurality of second transactions to generate a plurality of certificates before receiving requests for using the certificates. This allows the generation of a certificate to be separated from the distribution and the writing-off of the certificate, so that the impact of processing certificates on the performance of the blockchain is reduced. The generation of the certificates on the blockchain system also provides additional transparency of the transaction activity. For example, nodes of the blockchain system may verify the certificates based on the certificate specification.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be validated and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a sub-set of entities (nodes) (e.g., at least 7 entities) must sign every block in order for the block to be validated and added to the blockchain.

FIG. 1 is a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

The blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart contract may include a plurality of subroutines or functions, each of which may be a sequence of program instructions that performs a specific task. The smart contract may be operational code that is fully or partially executed without human interaction.

As each of the nodes 102-110 may store a copy of the blockchain 120, each of the nodes 102-110 may also have access to a copy of the smart contract included in the blockchain 120. In an embodiment, the smart contract may be assigned with an address on the blockchain 120, e.g., after the smart contract is compiled into operational code. The address of the smart contract is configured or used to locate the smart contract on the blockchain 120.

In an embodiment, a node (e.g., the node 102) in the blockchain system 100 may perform a transaction based on a copy of the smart contract. After a new block including the transaction is broadcasted to the blockchain system 100, other nodes in the blockchain system 100 may verify the new block. After the new block is verified by a majority or all of the nodes in the blockchain system 100, the new block may be added to the respective copies of the blockchain 120 on those nodes, and the transaction is complete.

Figure 2:
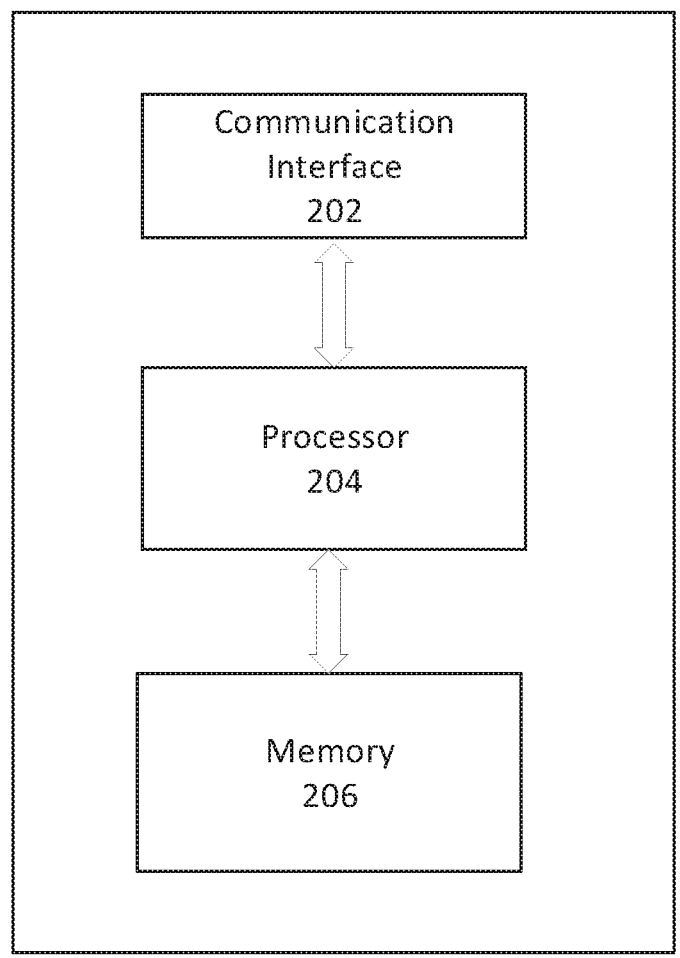
FIG. 2 is a schematic diagram of a computing device for implementing a node in a blockchain system, according to an embodiment.

FIG. 2 is a schematic diagram of a computing device 200 for implementing a node, e.g., the node 102 (FIG. 1), in a blockchain system, according to embodiments of the specification. Referring to FIG. 2, the computing device 200 may include a communication interface 202, a processor 204, and a memory 206.

The communication interface 202 may facilitate communication between the computing device 200 and devices implementing other nodes, e.g., the nodes 104-110 (FIG. 1), in the network. In some embodiments, the communication interface 202 may support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and executes instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Referring back to FIG. 1, the blockchain system 100 may be used in transaction activities that involve open data and transparent terms, such as a sales promotion activity, a marketing activity, etc. For example, a merchant may issue certificates, such as coupons, to customers who never purchased such products. By using the blockchain system 100, issuance of the coupons may be enforced using a smart contract. For example, if a customer meets a term specified in a smart contract (e.g., "consumer never purchased this product"), a corresponding event may be enforced to occur (e.g., "issue a coupon to that consumer"). Using the smart contract may make contract terms and conditions transparent because the smart contract is stored in a blockchain and open to users.

The certificates may include coupons, tickets, vouchers, or the like. For example, the coupons may be used in a sales promotion activity, providing discounts to users of an online platform. Also for example, the tickets may be used in an event (e.g., a concert) or a site of interest (e.g., a tourist destination, a museum, or the like), providing access to the event or the site of interest. As another example, during holidays, a site of interest may provide a limited number of tickets to control the traffic of visitors. In these examples, the certificates may be popular among users, further requiring the transparency for processing the certificates. As the blockchain system may prevent tampering and manipulation of stored data by malicious parties and each node of the blockchain system may include a copy the blockchain, the processing of the certificates in a blockchain system can be trustable and verifiable.

In an embodiment, a device 130 in FIG. 1 may be used by a user, e.g., a merchant, to interact with the blockchain system 100. The device 130 may be a computing device similar to the computing device 200 (FIG. 2), which may include a communication interface, a processor, and a memory. In some embodiments, the device 130 operates as a node of the blockchain system 100. In other embodiments, the device 130 does not operate as a node and may interact with the blockchain system 100 through connections established with one or more nodes, e.g., the nodes 102-110, of the blockchain system 100. The connections may be established through one or more application programming interfaces (APIs). Software development kits (SDKs) may also be provided to facilitate the establishment of such connections.

Figure 3:
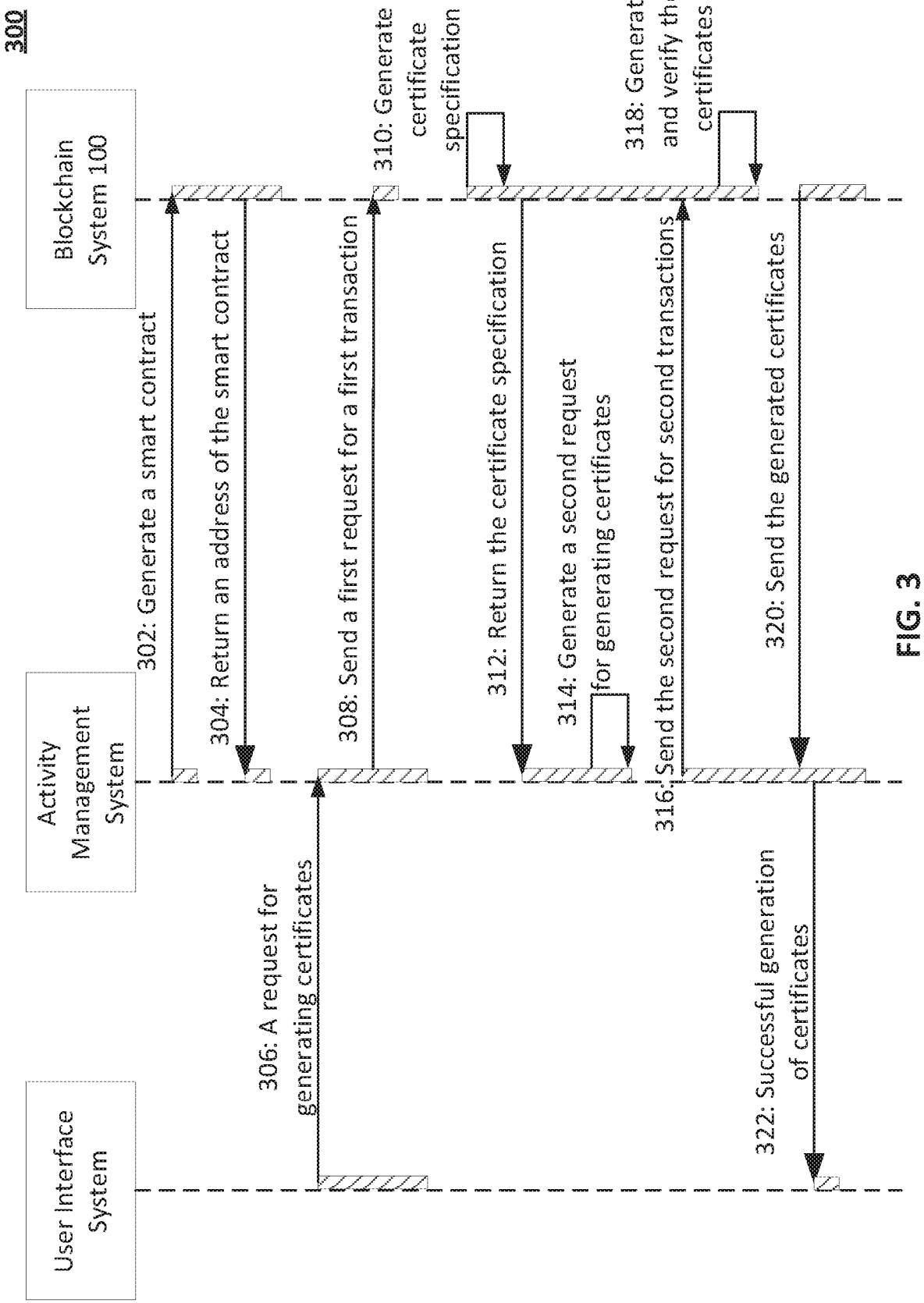
FIG. 3 is a flow chart of a method for processing certificates in a blockchain system, according to an embodiment.

FIG. 3 is a flow chart of a method 300 for processing certificates in a blockchain system, such as the blockchain system 100 (FIG. 1), according to an embodiment. For example; the method 300 is used to generate certificates. Also for example, the method 300 may be performed by one or more processors of the device 130 (FIG. 1), and the one or more processors may implement a user interface system and an activity management system. The user interface system may interact with a user, e.g., a merchant, to input and output data, and send a request for generating certificates to the activity management system. The activity management system may generate instructions or requests to the blockchain system 100 for execution. In some embodiments, the blockchain system may implement a consortium blockchain.

Referring to FIG. 3, at step 302, the activity management system may send to the blockchain system a request for generating a smart contract. In some embodiments, the smart contract may be provided by the user (e.g., by submitting user-generated program codes to the blockchain), or selected and configured by the user from template smart contracts provided by the blockchain service provider. For example, the user may select a smart contract from a menu and provide customized parameters. The smart contract may represent a strategy and rules of the transaction activity set by the user. For example, in a coupon-based sales promotion activity, the rules may include limitations on a permitted total value of coupons received per customer, a permitted total number of coupons received per customer, denominations of the coupons, types of the coupons, a percentage of targeted customers in a designated geographic region, methods for customers to receive the coupons, conditions and limitations for customers to use the coupons, etc.

Accordingly, at step 304, the blockchain system 100 may generate the smart contract, and return an address of the generated smart contract. The address of the smart contract may include a plurality of digits (e.g., 160 binary digits). In some embodiments, the address of the smart contract may be stored and transmitted using a hash value corresponding to the address. When a transaction is sent to the address of the smart contract, the transaction may be executed by a corresponding function of the smart contract. The smart contract may include a plurality of functions, such as a certificate specification generation function, a certificate generation function, a certificate verification function, or a writing-off function. It is appreciated that, the generated smart contract may be used for different transaction activities, such as issuing coupons, issuing tickets, etc., according to different requests.

At step 306, the activity management system may receive a request for generating certificates from the user interface system. For example, the user interface system may generate the request based on user input. The request for generating certificates may include information regarding the certificates to be generated. In some embodiments, the information regarding the certificates may include at least one of certificate types, a number of certificates for each certificate type, a total number of the certificates, or a valid period of each certificate. For example, a request for generating coupons may request generating 1,000 coupons for three-dollar discount and 500 coupons for five-dollar discount, and these coupons will be valid for three days.

Based on the request for generating certificates received from the user interface system, the activity management system may generate a first request for a first transaction, and the first transaction is used to cause the blockchain system to execute the smart contract to generate a certificate specification based on the first request. At step 308, the activity management system may further send the first request for the first transaction to the blockchain system 100. For example, the first request for the first transaction may be sent to the address of the smart contract received from the blockchain system at step 304.

At step 310, in response to the first request for the first transaction, the blockchain system 100 executes the smart contract to generate a certificate specification based on the information from the request for generating certificates. For example, the blockchain system 100 executes the certificate specification generation function of the smart contract to execute the first transaction. As a result of the execution of the first transaction, the certificate specification may be generated and stored, e.g., as a hash value. The generated certificate specification may include at least one of certificate types of the certificates to be generated, a number of certificates for each certificate type, a total number of the certificates, or a valid period of each certificate. The certificate specification, as a result of the execution of a transaction, may be recorded on the blockchain and accessible by nodes of the blockchain system 100. Thus, the certificate specification is public on the blockchain to ensure transparency of the transaction activity.

At step 312, the activity management system may receive the certificate specification from the blockchain system 100. At step 314, the activity management system may generate a second request for generating certificates based on the certificate specification. For example, the certificate specification may specify 1,000 coupons for three-dollar discount and 500 coupons for five-dollar discount, and accordingly, the activity management system may generate the second request for generating 1,000 coupons for three-dollar discount and 500 coupons for five-dollar discount, based on the certificate specification. The second request may include a plurality of second transactions corresponding to the certificates. In some embodiments, each of the plurality of second transactions corresponds to one certificate. For example, a second transaction may be directed to generating a coupon for three-dollar discount, and another second transaction may be directed to generating a coupon for five-dollar discount. It is appreciated that one second transaction may be also directed to generating multiple certificates.

At step 316, the activity management system may send the second request for the second transactions to the blockchain system 100. For example, the second transactions may be sent to the address of the smart contract.

At step 318, in response to the second request for the second transactions, the blockchain system 100 may execute the smart contract to generate certificates corresponding to the second transactions. As a result of the execution of the second transactions, the certificates may be generated and stored, e.g., as hash values. Each of the generated certificates may include information related to the certificate. For example, if the certificate is a coupon, the certificate may include a code of the coupon, a type of the coupon, discount provided by the coupon, an applicable category of the coupon, a valid period of the coupon, and the like. The generated certificates may be stored in the blockchain system 100.

In some embodiments, at step 318, the blockchain system 100 may also execute the verification function of the smart contract to determine whether the generated certificates satisfy the certificate specification. The verification function may monitor types and a number of the generated certificates, and determine whether the types and the number of the generated certificates satisfy the requirement of the certificate specification. For example, if the certificate specification specifies 1,000 coupons for three-dollar discount and 500 coupons for five-dollar discount, and the verification function may determine that the generated certificates satisfy the certificate specification when the satisfaction determination function determines that 1,000 coupons for three-dollar discount and 500 coupons for five-dollar discount are generated. In response to the determination that the generated certificates satisfy the certificate specification, the smart contract stops generating certificates. It is appreciated that the verification function may also verify the valid period of each generated certificate.

At step 320, the blockchain system 100 may send the generated certificates to the activity management system. Accordingly, at step 322, the activity management system may send the user interface system a message indicating the successful generation of certificates.

Figure 4:
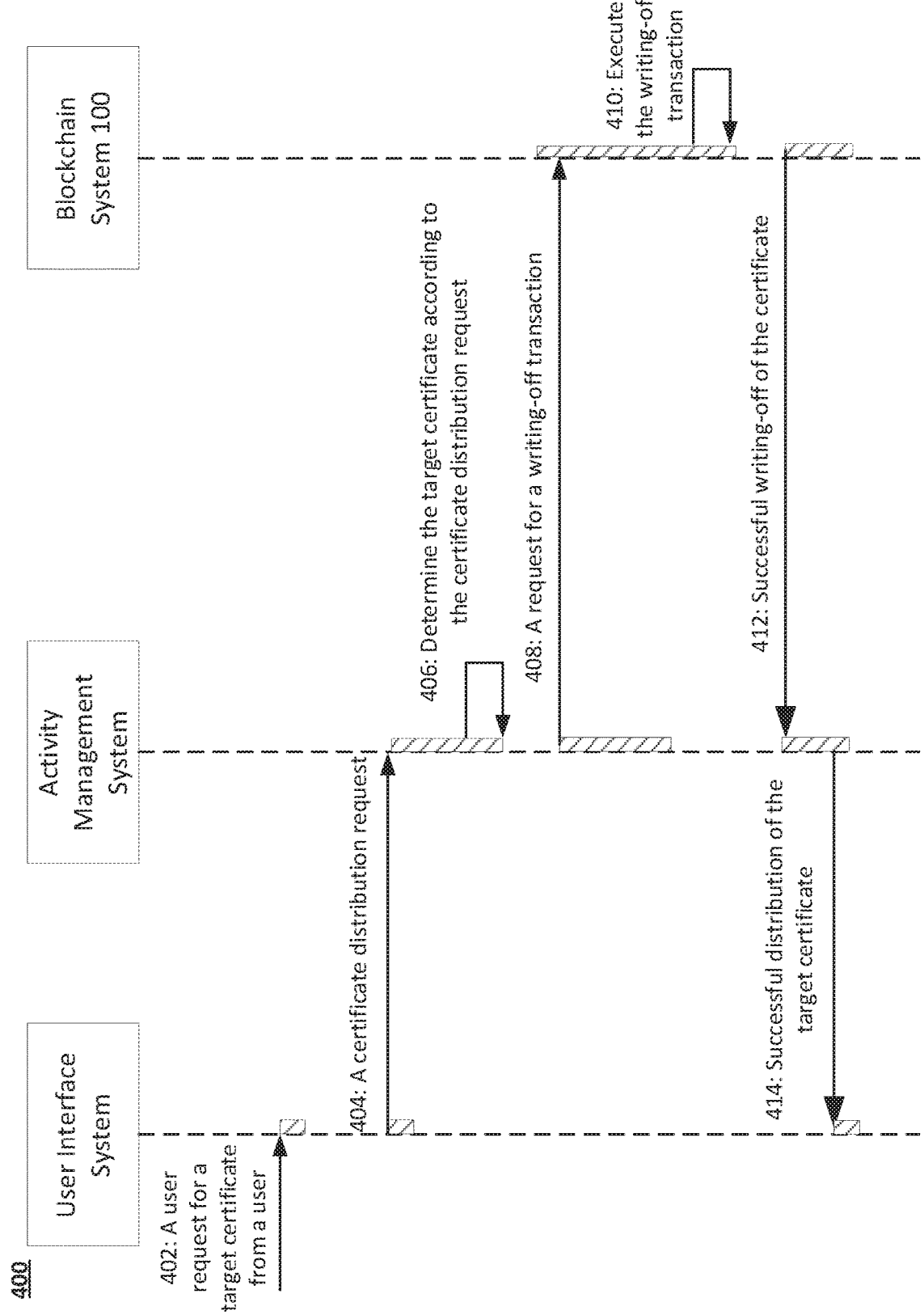
FIG. 4 is a flow chart of a method for processing certificates in a blockchain system, according to an embodiment.

FIG. 4 is a flow chart of a method 400 for processing certificates in a blockchain system, according to an embodiment. For example, the method 400 is used to distribute certificates to users and write off the distributed certificates on the blockchain system. Also for example, the method 400 may be performed by the device 130 (FIG. 1), which may include the user interface system and the activity management system.

Referring to FIG. 4, at step 402, the user interface system may receive a user request for a target certificate from a user. The user request may include information of a target certificate, an identification (ID) of the user, and the like. The information of the target certificate may include a type of the target certificate. The ID may be used to identify the user when the target certificate is being distributed to the user. It is appreciated that the user may request the target certificate through any type of networks, such as Internet.

At step 404, the user interface system may generate a certificate distribution request based on the user request, and send the certificate distribution request to the activity management system. The ID of the user requesting the certificate may be sent to the activity management system with the certificate distribution request.

Based on the received certificate distribution request, at step 406, the activity management system may determine a certificate as the target certificate to be distributed. As described above, at step 320 (FIG. 3), the generated certificates are sent to the activity management system. Therefore, the activity management system may determine the target certificate among the received certificates based on the certificate distribution request. For example, the activity management system may determine a type of the target certificate, and determine if the received certificates have a valid certificate of the determined type. In some embodiments, the activity management system may have a list of valid certificates. If the list of valid certificates has a valid certificate of the determined type, the activity management system may determine the valid certificate as the target certificate for the user.

After the target certificate is determined, at step 408, the activity management system may send a request for a writing-off transaction to the blockchain system 100. For example, writing-off is a cancellation or an elimination of an item from an account. In the embodiment, when a certificate is distributed to a user, that certificate may not be used by another user and, thus, may be written-off. In some embodiments, distribution of the certificate may be verified before the certificate is written off. Also for example, the writing-off transaction may be sent to the address of the smart contract before the target certificate is distributed. When the blockchain system 100 receives the request and writes off the target certificate, the certificate may not be used by another user. In some embodiments, the activity management system may asynchronously send, to the blockchain system, a plurality of requests for a plurality of writing-off transactions, each of the plurality of writing-off transactions causing the blockchain system to execute the smart contract to write off a corresponding target certificate of the plurality of certificates. This avoids overloading the blockchain system at a particular time.

At step 410, in response to the request for the writing-off transaction, the blockchain system 100 executes the smart contract to write off the target certificate. For example, the blockchain system 100 executes the writing-off function of the smart contract to execute the writing-off transaction. For example, the writing-off function of the smart contract may determine whether the target certificate is valid. It is appreciated that the target certificate is valid when the target certificate is to be written-off. As the consensus of the blockchain system 100 may take some time, e.g., a few seconds, to reach, another request for the target certificate may be received before the consensus is reached. The writing-off function of the smart contract writes off the target certificate after distributing the certificate. Thus, the written-off function may respond to the other request that the certificate is now invalid, and the response may also include information of the user (e.g., the ID of the user) to whom the certificate is distributed to.

At step 412, the blockchain system 100 may send a message to the activity management system indicating the successful writing-off of the certificate. On the other hand, when the request for the writing-off transaction is received, the certificate may be distributed and is no longer valid. In this situation, the blockchain 100 may send a message indicating a failed writing-off to the activity management system. And the activity management system may re-execute step 406 to request another certificate for distribution.

At step 414, upon receiving the message indicating the successful writing-off of the certificate, the activity management system may send a result of successful distribution of the target certificate to the user interface system.

In the method 300 (FIG. 3) and the method 400 (FIG. 4), the distribution and the writing-off of a certificate are separated from the generation of the certificate. Therefore, the computation burden on the blockchain system 100 may be spread over a period of time, and the impact on the performance of the blockchain system 100 may be reduced.

Figure 5:
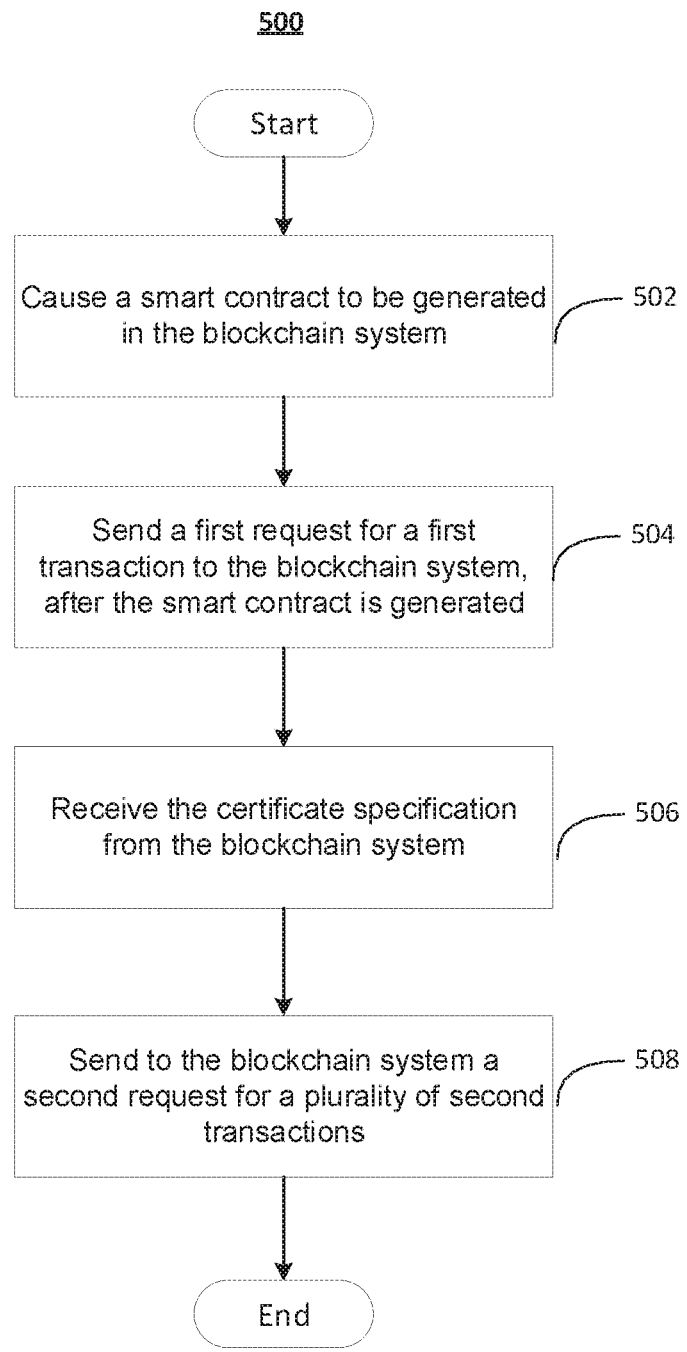
FIG. 5 is a flow chart of a computer-implemented method for processing certificates in a blockchain system, according to an embodiment.

FIG. 5 is a flow chart of a computer-implemented method 500 for processing certificates in blockchain system, according to an embodiment. The method 500 may be performed by a computer system. The computer system may include a memory storing a set of instructions and at least one processor to execute the set of instructions to cause the computer system to perform the method 500. For example, the computer system may be the device 130 (FIG. 1), which may include the user interface system and the activity management system (FIGS. 3 and 4). Referring to FIG. 5, the method 500 may include the following steps.

At step 502, the computer system may cause a smart contract to be generated in the blockchain system, e.g., the blockchain system 100 (FIG. 1). As described above, the smart contract may include computer-readable instructions for processing certificates. The certificates may be coupons, tickets, vouchers, etc.

At step 504, the computer system may send a first request for a first transaction to the blockchain system, after the smart contract is generated. The first transaction may be sent to the address of the smart contract for execution. For example, the first transaction may cause the blockchain system to execute the smart contract to generate a certificate specification based on the first request. The certificate specification may include a hash value representing the execution of the first transaction. The certificate specification may also include at least one of certificate types, a number of certificates for each certificate type, a total number of the certificates, or a valid period of each certificate. In some embodiments, the certificates include at least one of coupons, tickets, vouchers, or the like.

At step 506, the computer system may receive the certificate specification from the blockchain system. Based on the certificate specification, the computer system may generate a second request for a plurality of second transactions.

At step 508, the computer system may send to the blockchain system the second request for the plurality of second transactions. The plurality of second transactions may be sent to the address of the smart contract. The plurality of second transactions cause the blockchain system to execute the smart contract to generate and verify a plurality of certificates. In some embodiments, in verifying the plurality of certificates, the blockchain system may be caused to execute the smart contract to determine whether the plurality of certificates satisfy the certificate specification. For example, the blockchain system may determine whether generated certificates are certificates of a requested certificate type, whether a number of the generated certificates satisfies the requested number for the certificate type, whether a number of all generated certificates satisfies the requested total number of certificates, or whether a valid period of a generated certificate satisfies the requested valid period. In some embodiments, when all conditions of the certificate specification are satisfied, the blockchain system determines that the plurality of certificates satisfy the certificate specification and sends a message indicating the plurality of certificates are successfully generated to the computer system.

The computer system may also distribute the plurality of certificates to users. For example, the computer system may receive a request for a target certificate. The request for the target certificate may be generated based on user input. For example, the user interface system of the computer system may receive user input requesting for a certificate, and generate the request accordingly.

Figure 6:
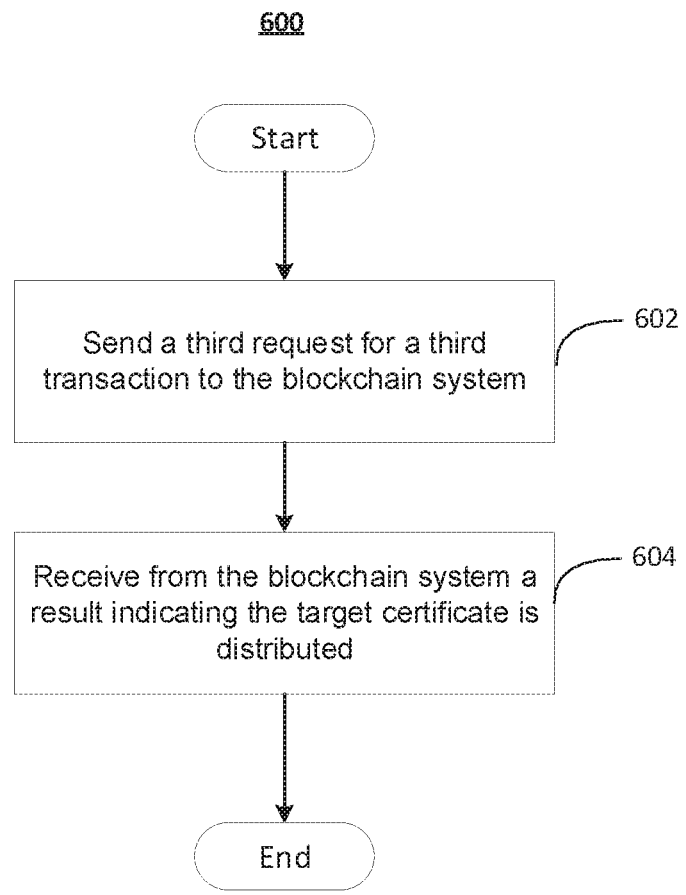
FIG. 6 is a flow chart of a computer-implemented method for processing certificates in a blockchain system, according to an embodiment.

FIG. 6 is a flow chart of a computer-implemented method 600 for processing certificates in a blockchain system, according to an embodiment. The method 600 may also be performed by the computer system described in connection with FIG. 5. It is appreciated that the method 600 may be implemented as a part of the method 500 or as a separate method. Referring to FIG. 6, the method 600 may include the following steps.

At step 602, the computer system may send a third request for a third transaction to the blockchain system. The third transaction may be sent to the address of the smart contract running on the blockchain system, before a target certificate of the plurality of certificates received from the blockchain system is distributed. The blockchain system may be caused by the third transaction to execute the smart contract to write off the target certificate. As described above, the plurality of certificates may be coupons, tickets, vouchers, etc. In some embodiments, when the target certificate is a target coupon, the blockchain system is caused to execute the smart contract to write off the target coupon. In some embodiments, the computer system may asynchronously send, to the blockchain system, a plurality of third requests for a plurality of third transactions, each of the plurality of third transactions causing the blockchain system to execute the smart contract to write off a corresponding target certificate of the plurality of certificates. This avoids overloading the blockchain system at a particular time.

A result indicating the target certificate is implemented may be generated and sent to the computer system. Therefore, at step 604, the computer system may receive from the blockchain system the result indicating the target certificate is implemented.

Figure 7:
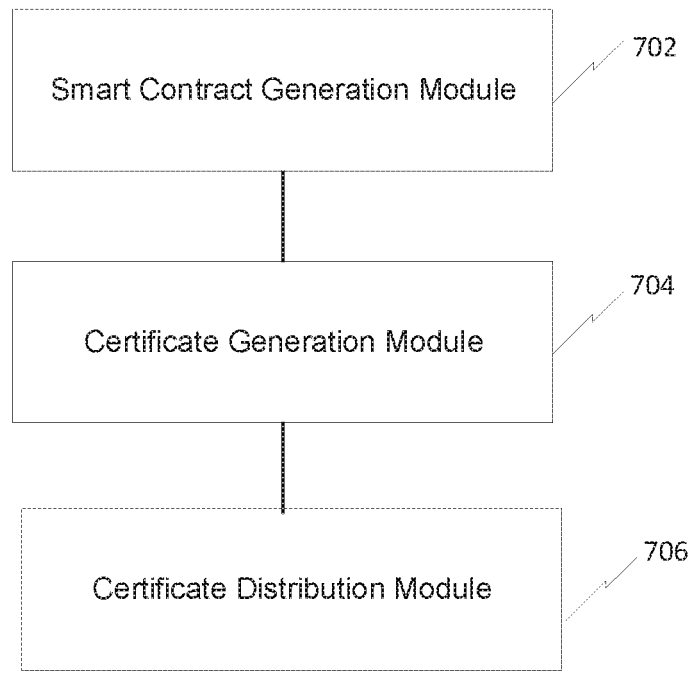
FIG. 7 is a block diagram of an apparatus for processing certificates in a blockchain system, according to an embodiment.

FIG. 7 is a block diagram of an apparatus 700 for processing certificates in a blockchain system, according to an embodiment. For example, the apparatus 700 may implement the device 130 (FIG. 1). Also, for example, the apparatus 700 may perform the method 500 (FIG. 5) and the method 600 (FIG. 6). Referring to FIG. 7, the apparatus 700 may include a smart contract generation module 702 and a certificate generation module 704.

The smart contract generation module 702 may cause a smart contract to be generated in the blockchain system. The smart contract may include computer-readable instructions for processing certificates. The certificate generation module 704 may send a first request for a first transaction to the blockchain system, the first transaction causing the blockchain system to execute the smart contract to generate a certificate specification based on the first request. The certificate generation module 704 may receive from the blockchain system the certificate specification. The certificate generation module 704 may further send, to the blockchain system, a second request for a plurality of second transactions, the plurality of second transactions causing the blockchain system to execute the smart contract to generate a plurality of certificates.

In some embodiments, the apparatus 700 may also include a certificate distribution module 706. The certificate distribution module 706 may send, to the blockchain system, a third request for a third transaction, the third transaction causing the blockchain system to execute the smart contract to write off a target certificate of the plurality of certificates before the target certificate is distributed. The certificate distribution module 706 may receive, from the blockchain system, a result indicating that the target certificate is written off.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 700 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 700, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for processing certificates in a blockchain system, comprising:
    causing a smart contract to be generated in the blockchain system, wherein the smart contract includes computer-readable instructions for processing certificates;
    after the smart contract is generated, sending a first request for a first transaction to the blockchain system, the first transaction causing the blockchain system to execute the smart contract to generate a certificate specification based on the first request;
    receiving, from the blockchain system, the certificate specification;
    sending, to the blockchain system, a second request for a plurality of second transactions, the plurality of second transactions causing the blockchain system to execute the smart contract to generate a plurality of certificates, wherein the plurality of certificates comprise at least one of coupons, tickets, or vouchers; and
    asynchronously sending, to the blockchain system, a plurality of third requests for a plurality of third transactions, each of the plurality of third transactions causing the blockchain system to execute the smart contract to write off a corresponding target certificate of the plurality of certificates.

2. The method of claim 1, further comprising:
    generating the second request for the plurality of second transactions based on the certificate specification.

3. The method of claim 1, wherein the certificate specification indicates at least one of certificate types, a number of certificates for each certificate type, a total number of the certificates, or a valid period of each certificate.

4. The method of claim 3, further comprising:
    causing the blockchain system to execute the smart contract to determine whether the plurality of certificates satisfy the certificate specification; and
    after it is determined that the plurality of certificates satisfy the certificate specification, receiving a message indicating the plurality of certificates are successfully generated.

5. The method of claim 1, further comprising:
    distributing the plurality of certificates to users.

6. The method of claim 1, wherein the certificate specification includes a hash value representing execution of the first transaction, and each of the plurality of certificates includes a hash value representing execution of a corresponding second transaction.

7. The method of claim 1, wherein the blockchain system implements a consortium blockchain.

8. A device for processing certificates in a blockchain system, the device comprising:
one or more processors; and
one or more computer-readable memories coupled to the one or more processors and having instructions stored thereon that are executable by the one or more processors,
wherein the one or more processors are configured to:
cause a smart contract to be generated in the blockchain system, wherein the smart contract includes computer-readable instructions for processing certificates;
after the smart contract is generated, send a first request for a first transaction to the blockchain system, the first transaction causing the blockchain system to execute the smart contract to generate a certificate specification based on the first request;
receive, from the blockchain system, the certificate specification;
send, to the blockchain system, a second request for a plurality of second transactions, the plurality of second transactions causing the blockchain system to execute the smart contract to generate a plurality of certificates, wherein the plurality of certificates comprise at least one of coupons, tickets, or vouchers; and
asynchronously send, to the blockchain system, a plurality of third requests for a plurality of third transactions, each of the plurality of third transactions causing the blockchain system to execute the smart contract to write off a corresponding target certificate of the plurality of certificates.

9. The device of claim 8, wherein the one or more processors are further configured to:
generate the second request for the plurality of second transactions based on the certificate specification.

10. The device of claim 8, wherein the certificate specification indicates at least one of certificate types, a number of certificates for each certificate type, a total number of the certificates, or a valid period of each certificate.

11. The device of claim 10, wherein the one or more processors are further configured to:
cause the blockchain system to execute the smart contract to determine whether the plurality of certificates satisfy the certificate specification; and
after it is determined that the plurality of certificates satisfy the certificate specification, receive a message indicating the plurality of certificates are successfully generated.

12. The device of claim 8, wherein the one or more processors are further configured to:
distribute the plurality of certificates to users.

13. The device of claim 8, wherein the certificate specification includes a hash value representing execution of the first transaction, and each of the plurality of certificates includes a hash value representing execution of a corresponding second transaction.

14. A non-transitory computer-readable medium having stored therein instructions that, when executed by a processor of a device, cause the device to perform a method for processing certificates in a blockchain system, the method comprising:
causing a smart contract to be generated in the blockchain system, wherein the smart contract includes computer-readable instructions for processing certificates;
after the smart contract is generated, sending a first request for a first transaction to the blockchain system, the first transaction causing the blockchain system to execute the smart contract to generate a certificate specification based on the first request;
receiving, from the blockchain system, the certificate specification;
sending, to the blockchain system, a second request for a plurality of second transactions, the plurality of second transactions causing the blockchain system to execute the smart contract to generate a plurality of certificates, wherein the plurality of certificates comprise at least one of coupons, tickets, or vouchers; and
asynchronously sending, to the blockchain system, a plurality of third requests for a plurality of third transactions, each of the plurality of third transactions causing the blockchain system to execute the smart contract to write off a corresponding target certificate of the plurality of certificates.

15. The non-transitory computer-readable medium of claim 14, wherein the method further comprises:
generating the second request for the plurality of second transactions based on the certificate specification.

16. The non-transitory computer-readable medium of claim 14, wherein the certificate specification indicates at least one of certificate types, a number of certificates for each certificate type, a total number of the certificates, or a valid period of each certificate.

17. The non-transitory computer-readable medium of claim 16, wherein the method further comprises:
causing the blockchain system to execute the smart contract to determine whether the plurality of certificates satisfy the certificate specification; and
after it is determined that the plurality of certificates satisfy the certificate specification, receiving a message indicating the plurality of certificates are successfully generated.

18. The non-transitory computer-readable medium of claim 14, wherein the method further comprises:
distributing the plurality of certificates to users.

19. The non-transitory computer-readable medium of claim 14, wherein the certificate specification includes a hash value representing execution of the first transaction, and each of the plurality of certificates includes a hash value representing execution of a corresponding second transaction.

\* \* \* \* \*